US011943098B2

(12) United States Patent
Tse et al.

(10) Patent No.: US 11,943,098 B2
(45) Date of Patent: Mar. 26, 2024

(54) MANAGEMENT MODEL FOR NODE FAULT MANAGEMENT

(71) Applicant: Telefonaktiebolaget LM Ericsson (publ), Stockholm (SE)

(72) Inventors: Edwin Tse, Montreal (CA); Robert Petersen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 17/441,456

(22) PCT Filed: Apr. 6, 2020

(86) PCT No.: PCT/IB2020/053287
§ 371 (c)(1),
(2) Date: Sep. 21, 2021

(87) PCT Pub. No.: WO2020/208506
PCT Pub. Date: Oct. 15, 2020

(65) Prior Publication Data
US 2022/0166671 A1    May 26, 2022

Related U.S. Application Data

(60) Provisional application No. 62/830,723, filed on Apr. 8, 2019.

(51) Int. Cl.
*H04L 41/0803* (2022.01)
*H04L 41/0681* (2022.01)
*H04L 41/069* (2022.01)

(52) U.S. Cl.
CPC ...... *H04L 41/0803* (2013.01); *H04L 41/0681* (2013.01); *H04L 41/069* (2013.01)

(58) Field of Classification Search
CPC ............. H04L 41/0803; H04L 41/0681; H04L 41/069; H04L 41/0853; H04L 41/0813;
(Continued)

(56) References Cited

U.S. PATENT DOCUMENTS 7,293,090 B1 * 11/2007 Saleh .................. H04L 43/0817
714/10
2014/0012867 A1 * 1/2014 Moss ....................... G06N 3/02
707/756
(Continued)

FOREIGN PATENT DOCUMENTS

CN        1361961 A    7/2002

OTHER PUBLICATIONS

3GPP TS 32.401 (3rd Generation Partnership Project); Technical Specification Group Service and System Aspects; Telecommunication management; Performance Management (PM); Concept and requirements (Release 15), published Jun. 2018 (Year: 2018).*
(Continued)

*Primary Examiner* — Huy D Vu
*Assistant Examiner* — Robert Ma
(74) *Attorney, Agent, or Firm* — COATS & BENNETT, PLLC

(57) ABSTRACT

In a network Fault Management (FM) model, network equipment (160) maintains a ManagedElement object (12). The ManagedElement object contains one or more ManagedFunction objects (14, 22, 24, 26) with each ManagedFunction object (16) comprising an FMControl object specifying the capabilities of the ManagedFunction objects to produce, report, and log fault reports, a Fault Type List object (18) listing the various types of faults the ManagedFunction object can detect, report, and log, and a currentFaultList object (20) listing the current faults and associated fault information. The FMControl object further
(Continued)

includes several attributes that are set by a Management System (30) to control the reading of fault reports as well as the sending of the fault reports to other interested network nodes (190).

19 Claims, 9 Drawing Sheets

(58) Field of Classification Search
CPC .......... H04L 41/0806; H04L 41/0233; H04W 24/04; H04W 24/02
See application file for complete search history.

(56) References Cited

U.S. PATENT DOCUMENTS

| | | | |
|---|---|---|---|
| 2014/0023032 A1* | 1/2014 | Kim ..................... | H04W 72/542 370/329 |
| 2015/0282107 A1* | 10/2015 | Vrind ................... | H04W 76/19 370/252 |
| 2015/0350932 A1* | 12/2015 | Da Silva ............... | H04W 76/19 370/225 |
| 2016/0105809 A1 | 4/2016 | Chou | |
| 2022/0210624 A1* | 6/2022 | Ping ..................... | H04W 24/04 |

OTHER PUBLICATIONS

3rd Generation Partnership Project, "3rd Generation Partnership Project; Technical Specification Group Services and System Aspects; Telecommunication Management; Fault Management; Part 2: Alarm Integration Reference Point (IRP): Information Service (IS) (Release 15)", Technical Specification, 3GPP TS 32.111-2 V15.1.0, Jun. 1, 2019, pp. 1-71, 3GPP.

3rd Generation Partnership Project, "3rd Generation Partnership Project; Technical Specification Group Services and System Aspects; Telecommunication Management; Configuration Management (CM); Notification Integration Reference Point (IRP); Information Service (IS) (Release 15)", Technical Specification, 3GPP TS 32.302 V15.1.0, Sep. 1, 2019, pp. 1-27, 3GPP.

3rd Generation Partnership Project, "3rd Generation Partnership Project; Technical Specification Group Services and System Aspects; Management and Orchestration of Networks and Network Slicing; Performance Management (PM); Stage 2 and Stage 3 (Release 15)", Technical Specification, 3GPP TS 28.551 V0.3.0, Jul. 1, 2018, pp. 1-34, 3GPP.

3rd Generation Partnership Project, "3rd Generation Partnership Project; Technical Specification Group Services and System Aspects; Telecommunication Management; Generic Network Resource Model (NRM) Integration Reference Point (IRP); Information Service (IS) (Release 15)", Technical Specification, 3GPP TS 28.622 V15.2.0, Dec. 1, 2018, pp. 1-30, 3GPP.

3rd Generation Partnership Project, "3rd Generation Partnership Project; Technical Specification Group Services and System Aspects; Management and Orchestration; Architecture Framework (Release 15)", Technical Specification, 3GPP TS 28.533 V15.1.0, Dec. 1, 2018, pp. 1-26, 3GPP.

Ericsson LM, "Add Support of Configurable FM", 3GPP TSG-SA5 Meeting #127, Sophia-Antipolis, France, Oct. 14, 2019, pp. 1-12, S5-196304, 3GPP.

* cited by examiner

MANAGEMENT MODEL FOR NODE FAULT MANAGEMENT

RELATED APPLICATIONS

This application claims the benefit of U.S. Provisional Application No. 62/830,723 filed 8 Apr. 2019, the entire disclosure of which being hereby incorporated by reference herein.

TECHNICAL FIELD

The present disclosure relates generally to networks, and in particular to a network management model for the management and reporting of faults of managed nodes (MNs).

BACKGROUND

Computing and telecommunications networks have grown in size, sophistication, and complexity, long past the point of effective manual network management. Network management systems to automate the considerable task of network monitoring and management have been developed and improved; many of which are sophisticated, complex software systems in their own right. Fault Management (FM) is one important aspect of network management. Under FM, network nodes detect and report various faults as alarms to other interested network nodes. In particular, Management systems (MSs) typically monitor the faults of its managed nodes (MNs).

Conventionally, MNs are expected to detect, record, and report their own faults as alarms to other interested nodes. To accomplish this goal, prior art systems typically employ one of several existing approaches. One approach, described in 3GPP TS 32.111-2 V15.0.0 "Telecommunication management; Fault Management; Part 2: Alarm Integration Reference Point (IRP): Information Service (IS)" utilizes an "agent-manager" concept in which the MS interacts with an agent (e.g. Element Manager—EM) using a specialized protocol. This protocol, which is specifically utilized for fault management, allows the agent and the MS to establish a system of fault reporting between them with the agent acting as an intermediary between the MS and the various MNs being managed.

Another approach described in 3GPP TS 28.551 V0.3.0 "Management and Orchestration of Networks and Network Slicing; Performance Management (PM); Stage 2 and Stage 3," utilizes a subscription paradigm for reporting errors related to the preparation of performance measurements. Particularly, with this approach, authorized "consumers" can request measurement job management related service "producers" to create measurement jobs. When a performance data file is ready, or when a fault occurs during preparation of the performance data file, the service producer notifies the consumers who have subscribed to receive this information.

Another approach that utilizes a subscription paradigm is described in 3GPP TS 32.302 V15.0.0 "Configuration Management (CM); Notification Integration Reference Point (IRP); Information Service (IS)." According to this technical specification, the EMs and Network Elements (NEs) being managed generate alarms about certain error-related events. An IRP Agent (typically another EM or another NE) subscribes to the EM or NE that generates the alarms, and thus, is notified about the alarms by an IRP manager when they occur.

These prior art solutions to detecting and reporting faults (i.e., FM) involve a high number of standardized interactions. For example, these prior art solutions must implement specialized operations to establish a subscription between the MS and a MN. The use of this subscription mechanism is to provide the MN with a reference (e.g., a call back address) so that the MN can issue a notification about a fault or error that occurred.

Additionally, prior art FM systems require the implementation of specialized operations in order to subscribe and unsubscribe, as well as various specialized notifyNewAlarm notifications. However, the operations that create and delete subscriptions require numerous input parameters and add complexity. This complexity is due to the fact that the MS does not interact with the MNs directly; but instead, interacts with an intermediary agent that manages the MNs.

In addition to this complexity of prior art FM systems, it is not possible for a conventionally configured MS to ascertain, at run-time, whether an MN is capable of fault reporting, or whether the MN is active but simply not actively detecting faults. Nor are such conventional MNs able to determine the types of faults the MN is capable of reporting. Thus, while the prior art solutions to FM are suitable for implementation by an entity such as an EM, which itself manages multiple MNs, it is not optimal for implementation by individual MNs (i.e., scenarios in which there is no agent acting as an intermediary).

The Background section of this document is provided to place embodiments of the present embodiment in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the embodiment or to delineate the scope of the embodiment. The sole purpose of this summary is to present some concepts disclosed herein in a simplified form as a prelude to the more detailed description that is presented later.

According to one or more embodiments of the present disclosure described and claimed herein, a method, performed by equipment operative in a network, of performing a Network Resource Management (NRM) Fault Management (FM) procedure, comprises maintaining a NRM Information Object Class (IOC) ManagedElement object comprising one or more NRM IOC ManagedFunction objects. Each ManagedFunction object configured to detect, report, and log faults. The method also comprises maintaining for each ManagedFunction object, a NRM IOC FMControl object comprising attributes indicating an administrative state; an operational state, a fault report target identifying one or more addresses where the ManagedFunction object is to send fault reports, one or more NRM faultTypeList objects, each faultTypeList object comprising attributes specifying types of faults that can be detected and reported by the ManagedFunction object, and a NRM currentFaultList object comprising current fault information. The method further comprises verifying the types of faults the ManagedFunction object is capable of detecting, reporting, and logging, and setting the administrative state attribute of the FMControl object to control the ManagedFunction object to detect faults and send the fault reports. Then, responsive to a network Management System setting the administrative state attribute of the FMControl object, and if the operational state attribute of the FMControl object is set, the method calls for detecting, reporting, and logging the faults, and sending the fault reports to the one or more addresses specified in the fault report target attribute of the FMControl object.

In one embodiment, the FMControl object further comprises a fault report log attribute indicating a specified location where the ManagedFunction object is to log the faults.

In one embodiment, the method further comprises writing information associated with the fault to the specified location responsive to determining that the operational state attribute of the FMControl object is set to ENABLED and that the administrative state attribute of the FMControl object is set to UNLOCKED, and ceasing to write the information associated with the fault to the specified location responsive to determining that the operational state attribute of the FMControl object is set to DISABLED and that the administrative state attribute of the FMControl object is set to LOCKED.

In one embodiment, writing the information associated with the fault to the specified location comprises verifying that sufficient space is available at the specified location to write information associated with a currently reported fault, and if insufficient space is available, deleting information associated with previously reported faults to make room to write the information associated with the currently reported fault.

In one embodiment, the ManagedFunction object detects, reports, and logs the faults responsive to the network Management System setting the administrative state attribute of the FMControl object to UNLOCKED, and ceases to detect, report, and log the faults responsive to the network Management System setting the administrative state attribute of the FMControl object to LOCKED.

In one embodiment, the ManagedElement object and the one or more ManagedFunction objects are provisioned in the equipment.

In one embodiment, the administrative state attribute of the FMControl object is set or reset by the network Management System at run-time.

In one embodiment, the operational state attribute of the FMControl object is set or reset by the ManagedFunction object at run-time.

In such embodiments, the ManagedFunction object sets the operational state attribute of the FMControl object to ENABLED to indicate that the ManagedFunction object has sufficient resources to detect the faults, produce the fault reports, and log the faults, and resets the operational state attribute of the FMControl object to DISABLED to indicate that the ManagedFunction object does not have sufficient resources to detect the faults, produce the fault reports, and log the faults.

In one embodiment, the present disclosure provides equipment operative in a network. The equipment comprises communication circuitry configured to send fault reports to a network node and processing circuitry operatively connected to the communication circuitry. In this embodiment, the processing circuitry is configured to maintain a NRM Information Object Class (IOC) ManagedElement object comprising one or more NRM IOC ManagedFunction objects, with each ManagedFunction object configured to detect, report, and log faults. The processing circuitry is also configured to maintain for each ManagedFunction object, a NRM IOC FMControl object comprising attributes indicating an administrative state;

an operational state, a fault report target identifying one or more addresses where the ManagedFunction object is to send the fault reports, one or more NRM faultTypeList objects, each faultTypeList object comprising attributes specifying types of faults that can be detected and reported by the ManagedFunction object, and a NRM currentFaultList object comprising current fault information. The processing circuitry is further configured to verify the types of faults the ManagedFunction object is capable of detecting, reporting, and logging, and to set the administrative state attribute of the FMControl object to control the ManagedFunction object to detect faults and send the fault reports. Responsive to a network Management System setting the administrative state attribute of the FMControl object, and if the operational state attribute of the FMControl object is set, the processing circuitry is configured to detect, report, and log the faults, and send the fault reports to the one or more addresses specified in the fault report target attribute of the FMControl object.

In one embodiment, the FMControl object further comprises a fault report log attribute indicating a specified location where the ManagedFunction object is to log the faults.

In one embodiment, the processing circuitry is further configured to write information associated with the fault to the specified location responsive to determining that the operational state attribute of the FMControl object is set to ENABLED, and that the administrative state attribute of the FMControl object is set to UNLOCKED, and cease writing the reported fault to the specified location responsive to determining that the operational state attribute of the FMControl object is set to DISABLED, and that the administrative state attribute of the FMControl object is set to LOCKED.

In one embodiment, to write the information associated with the fault to the specified location, the processing circuitry is configured to verify that sufficient space is available at the specified location to write information associated with a currently reported fault, and if insufficient space is available, delete information associated with previously reported faults to make room to write the information associated with the currently reported fault.

In one embodiment, the processing circuitry is further configured to detect, report, and log the faults responsive to the network Management System setting the administrative state attribute of the FMControl object to UNLOCKED, and cease detecting, reporting, and logging the faults responsive to the network Management System setting the administrative state attribute of the FMControl object to LOCKED.

In one embodiment, the ManagedElement object and the one or more ManagedFunction objects are provisioned in the equipment.

In one embodiment, the processing circuitry sets and resets the administrative state attribute of the FMControl object is set at run-time.

In one embodiment, the processing circuitry sets and resets the operational state attribute of the FMControl object at run-time.

In one embodiment, the processing circuitry sets the operational state attribute of the FMControl object to ENABLED to indicate that the ManagedFunction object has sufficient resources to detect the faults, produce the fault reports, and log the fault, and resets the operational state attribute of the FMControl object to DISABLED to indicate that the ManagedFunction object does not have sufficient resources to detect the faults, produce the fault reports, and log the faults.

In one embodiment, the present disclosure provides a non-transitory computer readable medium, having instructions stored thereon that, when executed by processing circuitry on an instance of network equipment, cause the processing circuitry to maintain a NRM Information Object Class (IOC) ManagedElement object comprising one or more NRM IOC ManagedFunction objects. Each ManagedFunction object is configured to detect, report, and log fault. The instructions, when executed by the processing circuitry, also cause the processing circuitry to maintain for each ManagedFunction object a NRM IOC FMControl object comprising attributes indicating an administrative state, an operational state, and a fault report target identifying one or more addresses where the ManagedFunction object is to send the fault reports, one or more NRM faultTypeList objects, each of which comprises attributes specifying types of faults that can be detected and reported by the ManagedFunction object, and a NRM currentFaultList object comprising current fault information. The instructions, when executed by the processing circuitry, also cause the processing circuitry to verify the types of faults the ManagedFunction object is capable of detecting, reporting, and logging, and set the administrative state attribute of the FMControl object to control the ManagedFunction object to detect faults and send the fault reports. Responsive to a network Management System setting the administrative state attribute of the FMControl object, and if the operational state attribute of the FMControl object is set, the instructions, when executed by the processing circuitry, also cause the processing circuitry to detect, report, and log the faults, and send the fault reports to the one or more addresses specified in the fault report target attribute of the FMControl object.

In one embodiment, the present disclosure provides a method of detecting, reporting, and logging faults. The method is implemented by a network Management System (MS) performing a Network Resource Management (NRM) Fault Management (FM) procedure in a network and comprises maintaining a NRM Information Object Class (IOC) ManagedElement object comprising one or more NRM IOC ManagedFunction objects, each ManagedFunction object configured to detect, report, and log faults, verifying types of faults a ManagedFunction object is capable of detecting, reporting, and logging based on fault type information specified in one or more faultTypeList objects associated with the ManagedFunction object, instructing the ManagedFunction object to detect, record, and report faults by setting an administrative state attribute of a NRM IOC FMControl object associated with the ManagedFunction object to a first predefined value, and instructing the ManagedFunction object to send fault reports to one or more addresses by writing the one or more addresses to a fault report target attribute of the FMControl object.

In one embodiment, the method further comprises instructing the ManagedFunction object to cease detecting, recording, and reporting faults by setting the administrative state attribute of the FMControl object to a second predefined value.

In one embodiment, the FMControl object further comprises an operational status attribute and a fault report log attribute. In these embodiments, the method further comprises reading fault reports from a specified location defined in the fault report log attribute responsive to determining that the administrative state attribute of the FMControl object is set to the first predefined value and that the operational state attribute is set to a third predefined value.

In one embodiment, the present disclosure provides a management node operative in a network and performing a Network Resource Management (NRM) Fault Management (FM) procedure in the network. The management node in this embodiment comprises communication circuitry configured to read fault reports from a specified location, and processing circuitry operatively connected to the communication circuitry. The processing circuitry is configured to maintain a NRM Information Object Class (IOC) ManagedElement object comprising one or more NRM IOC ManagedFunction objects, each of which is configured to detect, report, and log faults. The processing circuitry is also configured to verify types of faults a ManagedFunction object is capable of detecting, reporting, and logging based on fault type information specified in one or more faultTypeList objects associated with the ManagedFunction object, instruct the ManagedFunction object to detect, record, and report faults by setting an administrative state attribute of a NRM IOC FMControl object associated with the ManagedFunction object to a first predefined value, and instruct the ManagedFunction object to send fault reports to one or more addresses by writing the one or more addresses to a fault report target attribute of the FMControl object.

In one embodiment, the processing circuitry is further configured to instruct the ManagedFunction object to cease detecting, recording, and reporting faults by setting the administrative state attribute of the FMControl object to a second predefined value.

In one embodiment, the FMControl object further comprises an operational status attribute and a fault report log attribute. In these cases, the processing circuitry is further configured to read fault reports from a specified location defined in the fault report log attribute responsive to determining that the administrative state attribute is set to the first predefined value and that the operational state attribute is set to a third predefined value.

In one embodiment, the present disclosure provides a non-transitory computer readable medium, having instructions stored thereon that, when executed by processing circuitry on a management node operative in a network to perform a Network Resource Management (NRM) Fault Management (FM) procedure in the network, causes the processing circuitry to maintain a NRM Information Object Class (IOC) ManagedElement object comprising one or more NRM IOC ManagedFunction objects, each of which is configured to detect, report, and log faults. Additionally, when executed by the processing circuitry, the instructions further cause the processing circuitry to verify types of faults a ManagedFunction object is capable of detecting, reporting, and logging based on fault type information specified in one or more faultTypeList objects associated with the ManagedFunction object, instruct the ManagedFunction object to detect, record, and report faults by setting an administrative state attribute of a NRM IOC FMControl object associated with the ManagedFunction object to a first predefined value, and instruct the ManagedFunction object to send fault reports to one or more addresses by writing the one or more addresses to a fault report target attribute of the FMControl object.

In one embodiment, the present disclosure provides a network comprising an instance of network equipment configured to maintain a NRM Information Object Class (IOC) ManagedElement object comprising one or more NRM IOC ManagedFunction objects, each of which is configured to detect, report, and log faults. The network equipment is further configured to maintain, for each ManagedFunction object, a NRM IOC FMControl object comprising attributes indicating an administrative state, an operational state, a fault report target identifying one or more addresses where the ManagedFunction object is to send the fault reports, and one or more NRM faultTypeList objects, each faultTypeList object comprising attributes specifying types of faults that can be detected and reported by the ManagedFunction object. The network further provides a network management node configured to execute a NRM Fault Management (FM) procedure by verifying the types of faults a first ManagedFunction object is capable of detecting, reporting, and logging by reading the faultTypeList object for the first ManagedFunction object, instructing the first ManagedFunction object to detect, record, and report faults by setting the administrative state attribute of the FMControl object for the first ManagedFunction object to a first value, and instructing the first ManagedFunction object to send fault reports to one or more addresses by writing the one or more addresses to a fault report target attribute of the FMControl object.

BRIEF DESCRIPTION OF THE DRAWINGS

The present embodiment will now be described more fully hereinafter with reference to the accompanying drawings, in which embodiments of the embodiment are shown. However, this embodiment should not be construed as limited to the embodiments set forth herein. Rather, these embodiments are provided so that this disclosure will be thorough and complete, and will fully convey the scope of the embodiment to those skilled in the art. Like numbers refer to like elements throughout.

DETAILED DESCRIPTION

For simplicity and illustrative purposes, the present embodiments are described by referring mainly to an exemplary embodiment thereof. In the following description, numerous specific details are set forth in order to provide a thorough understanding of the present embodiment. However, it will be readily apparent to one of ordinary skill in the art that the present embodiments may be practiced without limitation to these specific details. In this description, well known methods and structures have not been described in detail so as not to unnecessarily obscure the present embodiment.

Figure 1:
FIG. 1 is a network model diagram illustrating Network Resource Management (NRM) model fragments according to one embodiment of the present disclosure.

Turning now to the drawings, FIG. 1 is a functional block diagram illustrating a system model 10 having a plurality of Network Resource Management (NRM) model fragments or "objects" according to one embodiment of the present disclosure. Particularly, as seen in FIG. 1, model 10 comprises a ManagedElement (ME) object 12, a ManagedFunction (MF) object 14, an FMControl object 16, a SupportedFaultTypeList object 18, and a currentFaultList object 20. Two of the objects i.e., ME object 12 and MF object 14—are known. These objects, both of Information Object Class (IOC), are defined, e.g., in the specifications listed in the Background section.

Briefly, and without limitation, the MF object 14, together with the ME object 12, represent a system (e.g., network equipment, a network, a subnetwork, etc.) manufactured by a particular vendor and in operation in an operator network. In one embodiment, an ME object 12 corresponds to a network node or other piece of equipment (i.e., a device hereinafter referred to as "managed equipment"), and comprises one or more MF objects 14. Each MF object 14 corresponds to distinct operations which the managed equipment may perform. These functions include, but are not limited to, detecting faults for a network management system, producing corresponding fault reports, reporting the fault reports to one or more addresses of interested nodes, and logging the fault reports to a log file. According to one embodiment of the present disclosure, an MF object 14 may be implemented as a class and contain only itself. That is, the given MF object 14 specifies the variables, classes, and functions that it needs to detect faults, report faults, and log faults, but does not contain the variables, classes, and functions associated with any other MF objects 14.

The present disclosure also provides three new objects the FMControl object 16, the supportedFaultTypeList object 18, and the currentFaultList object 20. As seen in FIG. 1, each of these objects is contained in MF 14.

More particularly, each MF object 14 contains one FMContol object 16 and represents the capabilities of MF object 14 to generate fault reports, report those fault reports to other interested nodes, and log the fault reports. The FMControl object 16 may be altered at runtime by both the ME object 12 and by the network system management, as explained herein, and includes attributes several attributes. As seen in the following table, some attributes control the administrative and operational states of the FMControl object 16 (and hence, the fault management procedures), while other attributes specify how the generated fault reports are to be logged and communicated to the network system management.

TABLE 1

FMControl Attributes

| Attribute Name | Values | Written By | Description |
| --- | --- | --- | --- |
| administrativeState | LOCKED (set) UNLOCKED (reset) | Network Management System | The administrativeState attribute indicates the administrative state of the FMControl object, and is set and reset to start and cease, respectively, fault detection, reporting, and logging. |
| operationalState | ENABLED (set) DISABLED (reset) | MF object | The operationalState attribute indicates the operational state of the FMCControl object. |
| faultReportLog | URL of fault report log file | MF object | The faultReportLog attribute specifies a path to a file system where the reported faults are logged. |
| faultReportTarget | URL of management node(s) | Network Management System | The faultReportTarget attribute is a list of addresses to which MF object 14 is to send fault reports. |

In one embodiment, the administrativeState attribute is set or reset by the Network Management System to effect fault detection, reporting, and logging by MF object 14. Particularly, the Network Management System sets this attribute to be UNLOCKED or LOCKED, using a WRITE command. Setting the attribute to UNLOCKED indicates to MF object 14 that it should begin detecting, reporting, and logging faults. Setting the attribute to LOCKED indicates to MF object 14 that fault detection, reporting, and recording are no longer needed, and thus, MF object 14 should suspend or cease detecting, reporting, and recording faults.

The operationalState attribute indicates the state of the FMControl object 16. In particular, MF object 14 sets this attribute to ENABLED or DISABLED. Setting the attribute to ENABLED indicates that MF object 14 has adequate resources to begin detecting faults and generating and logging the resultant fault reports. Resetting this attribute to DISABLED indicates that MF object 14 does not have sufficient resources to detect, report, or record faults, or to send fault reports to faultReportTarget.

The faultReportLog identifies the file system where the faults reports are to be logged. The size and location of the specified file system is determined by the MF object 14. In one embodiment, the file system is a circular log file. In situations where there is insufficient space to log new fault reports, MF object 14 deletes or overwrites the oldest fault reports to make room for the new fault reports. According to the present disclosure, MF object 14 is configured to log a fault report when:

a fault is detected; and
when the operationalState attribute is ENABLED; and
when the administrativeState attribute is UNLOCKED.

Additionally, according to the present disclosure, the Network System Management does not set faultReportLog. However, the network system management can read the logged fault reports from the file system identified in faultReportLog as long as:

the operationalState attribute is ENABLED; and
administrativeState attribute is UNLOCKED.

The faultReportTarget attribute identifies the addresses of one or more nodes that are interested in knowing about the faults detected and logged by MF object 14. The Network Management System writes these addresses, and as seen in more detail later, the MF object 14 sends the fault reports to each of these addresses.

Returning to FIG. 1, the supportedFaultTypeList object 18 comprises a list that identifies the various supported types of faults that MF object 14 is capable of detecting, reporting, and logging. However, unlike the data in FMControl object 16 which can be modified at runtime, the information in the supportedFaultTypeList object 18 cannot. Rather, the information included in the supportedFaultTypeList object 18 is created when MF object 14 is created or updated. According to the present embodiments, a single supportedFaultTypeList object 18 can be related to one or more MF objects 14, and one MF object 14 can use one or more supportedFaultTypeList objects 18.

The currentFaultList object 20 comprise a list of current fault information. More particularly, the currentFaultList object 20 is a list of all current fault reports. An occurrence of a fault report in the currentFaultList object 20 implies that the same fault report information has been reported to the one or more addresses in the list specified in the faultReportTarget attribute, and recorded in the log file specified in the faultReportLog attribute.

As seen in FIG. 1, MF object 14 contains only itself. That is, MF object 14 is implemented as a class having the variables, classes, and functions that it needs to detect faults, report faults, and log faults for itself, but not for those of any other MF objects 14. However, those of ordinary skill in the art should appreciate that the present disclosure is not so limited. In other embodiments, such as the embodiment seen in FIG. 2, MF object 14 can contain itself and one or more other MF objects 22, 24, and 26, also implemented as classes. In such embodiments, there is still an FMControl object 16, a supportedFaultTypeList object 18, and a currentFaultList 20.

Figure 2:
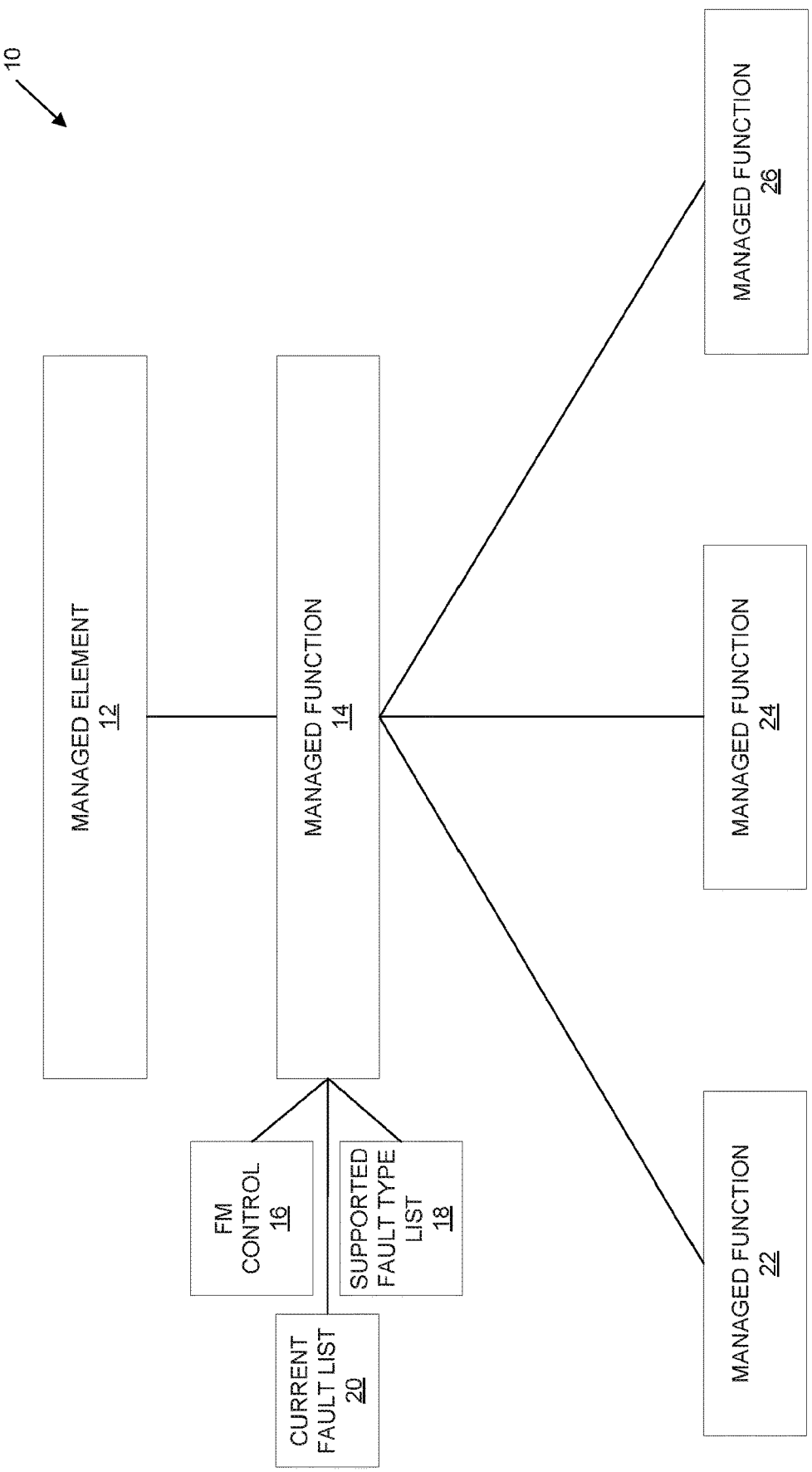
FIG. 2 is a signaling diagram depicting control signaling for Fault Management (FM) according to one embodiment of the present disclosure.

However, not only are the FMControl object 16, the supportedFaultTypeList object 18, and the currentFaultList 20 used in connection with the functions of MF object 14, they are also used in connection with the functions of MF objects 22, 24, and 26. For example, as seen in FIG. 2, the MF objects 14, 22, 24, and 26 form a tree with the ME object 12 forming the root of the tree. The top-level MF object i.e., MF object 14—is configured to detect, report, and log the faults that it is associated with, as well as those of all other MF objects 22, 24, 26 of the tree based on the information configured in FMControl object 16. The supportedFaultTypeList object 18 would comprise a list identifying the types of faults supported by MF objects 14, 22, 24, and 26, and a currentFaultList 20 comprising a list of current fault information for all MF objects 14, 22, 24, and 26.

Figure 3:
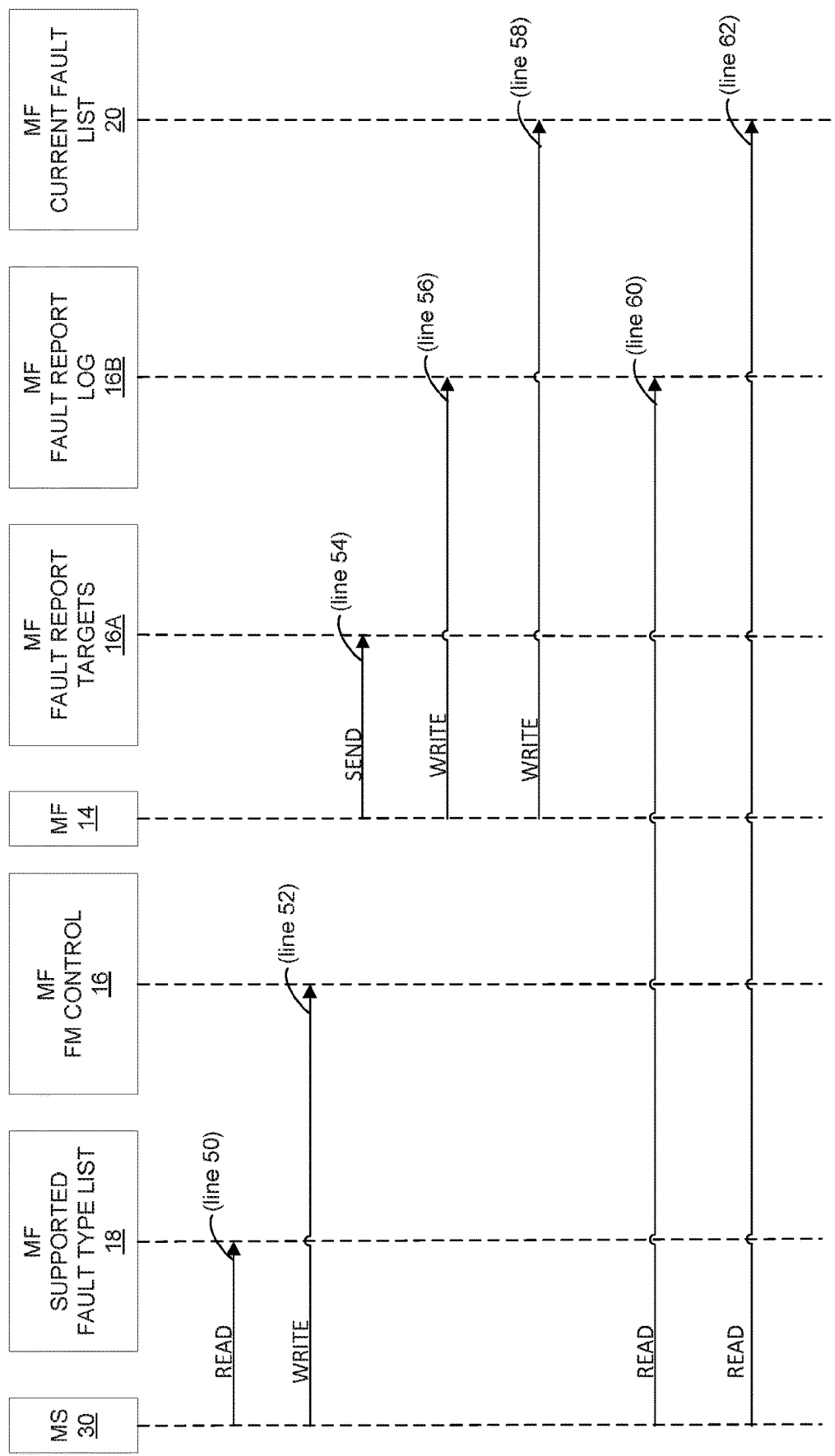
FIG. 3 is a flow diagram illustrating a method, implemented by network equipment, of performing a Network Resource Management (NRM) FM procedure according to one embodiment of the present disclosure.

FIG. 3 is a signaling diagram illustrating a fault management operation according to one embodiment of the present disclosure. As seen in FIG. 3, a Network Management System (MS) 30 reads the supportedFaultTypeList object 18 of MF object 14 to determine the types of faults that MF object 14 is capable of detecting, reporting, and logging (line 50). This may be accomplished, for example, using a READ command. So informed, MS 30 sets (or resets) the attributes of the FMControl object 16 to effect fault detection, reporting, and logging (line 52). Particularly, MS 30 sets the administrativeState attribute of the FMControl object 16 to UNLOCKED. This indicates to MF object 14 that it should begin detecting, reporting, and logging faults, as MF object 14 will perform these functions only when this attribute is set to UNLOCKED. Alternatively, MS 30 may reset the administrativeState attribute of the FMControl object 16 to LOCKED, as previously described, to indicate to MF object 14 that the fault detection, reporting, and recording are no longer needed. When this attribute is reset, MF object 14 suspends or ceases detecting, reporting, and recording faults. Additionally, MS 30 may use a WRITE command to write the addresses of the management nodes to the faultReportTarget attribute of the MFControl object 16 thereby indicating to MF object 14 where it should send the fault reports.

Whenever MF object 14 detects a fault, it generates a fault report and uses a SEND command to send the fault report to the one or more addresses listed in the faultReportTarget attribute 16a of FMControl object 16 (line 54). Additionally, MF object 14 utilizes a WRITE command to log the fault report to the file system identified in the faultReportLog attribute 16b of FMControl object 16 (line 56), and writes the fault report to the currentFaultList 20 (line 58). Thereafter, the MS 30 can issue one or more READ commands, for example, to read the historical fault report information from the log file identified in the faultReportLog attribute 16b of FMControl object 16 (line 60), and obtain information on current faults by reading the fault reports written to the currentFaultList 20 (line 62).

Figure 4:
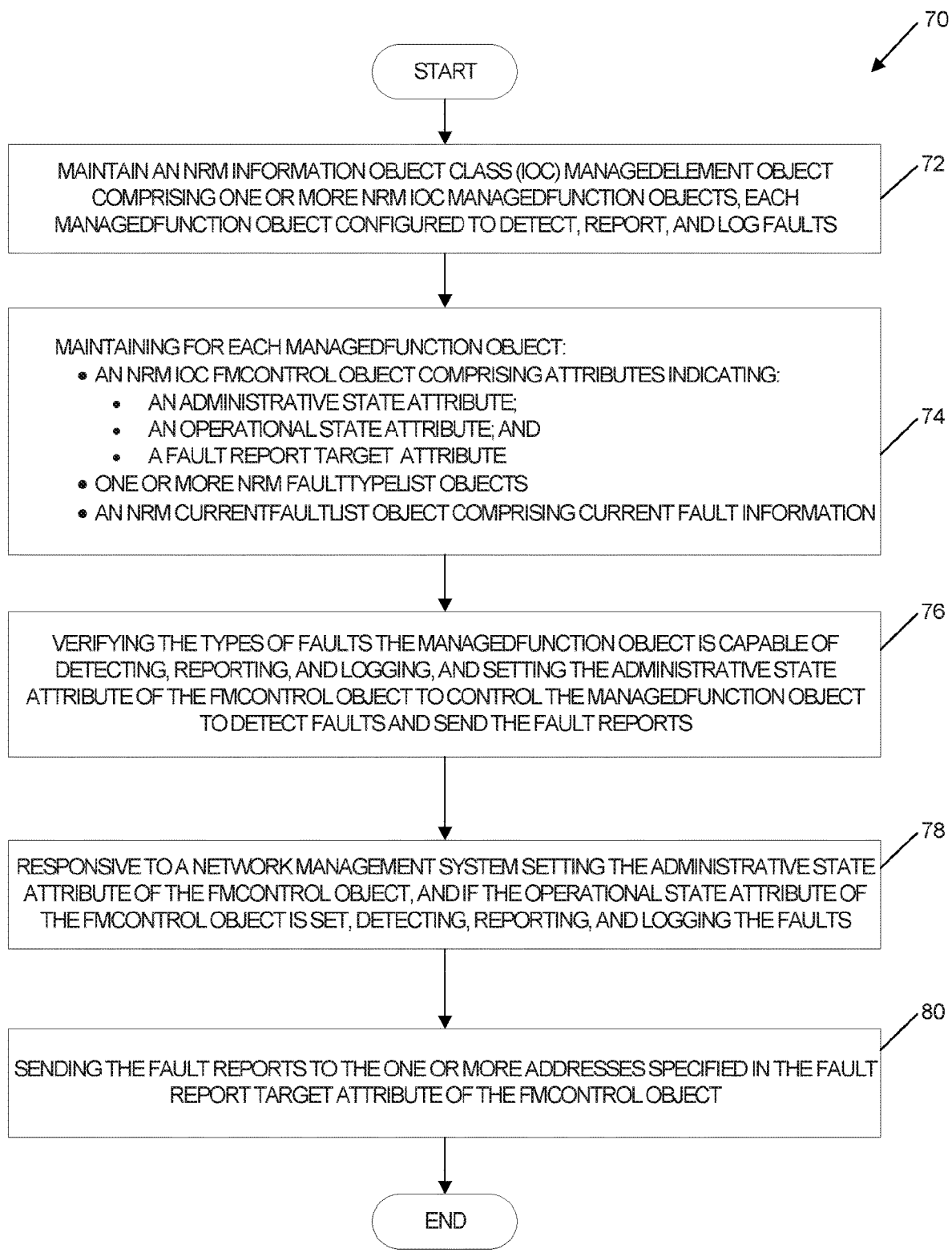
FIG. 4 is a flow diagram illustrating a method, implemented by network equipment, of detecting faults and writing fault reports according to one embodiment of the present disclosure.

FIG. 4 is a flow diagram illustrating a method 70 of performing a Network Resource Management (NRM) Fault Management (FM) procedure according to one embodiment of the present disclosure. It should be noted here that method 70 is described in terms of a single MF object 14. However, this is for illustrative purposes only. Method 70 is also applicable to embodiments where multiple MF objects 14, 22, 24, 26 exist, such as in the embodiment of FIG. 2.

As seen in FIG. 4, method 70 calls for maintaining a NRM Information Object Class (IOC) ME object 12 comprising one or more NRM IOC MF objects 14, with each MF object 14 configured to detect, report, and log faults (box 72). Method 70 also calls for maintaining, for each MF object 14, a NRM IOC FMControl object 16, one or more NRM faultTypeList objects 18, and a NRM currentFaultList object 20 (box 74). As previously described, the FMControl object 16 comprises a plurality of attributes including an administrative state attribute, an operational state attribute, and a faultReportTarget attribute identifying the one or more addresses where MF object 14 is to send fault reports. These objects can be set and reset to effect whether the MF object 14 detects, reports, and logs faults.

Method 70 continues with the MS 30 verifying the types of faults that MF object 14 is capable of detecting, reporting, and logging, and setting the administrativeState attribute of the FMControl object 16 to control the MF object 14 to detect faults and send the fault reports (box 76). These functions can be respectively accomplished by MS 30 utilizing a READ command to read the supportedFaultTypeList object 18, and a WRITE command to set the adminsitrativeState attribute of FMControl object 16 to UNLOCKED. In embodiments where MF object 14 is to suspend or cease detecting, reporting, and logging faults, MS 30 would reset the adminsitrativeState attribute of FMControl object 16 to LOCKED, as previously described.

In this embodiment, however, MF object 14 is to begin detecting, reporting, and logging faults. Therefore, responsive to MS 30 setting the administrativeState attribute of FMControl object 16, and if the operationalState attribute of FMControl object is set to ENABLED, MF object 14 begins the processes of detecting, reporting, and logging the faults (box 78). So logged, MF object 14 sends the fault reports to the one or more addresses specified in the faultReportTarget attribute of FMControl object 16 (box 80).

Figure 5:
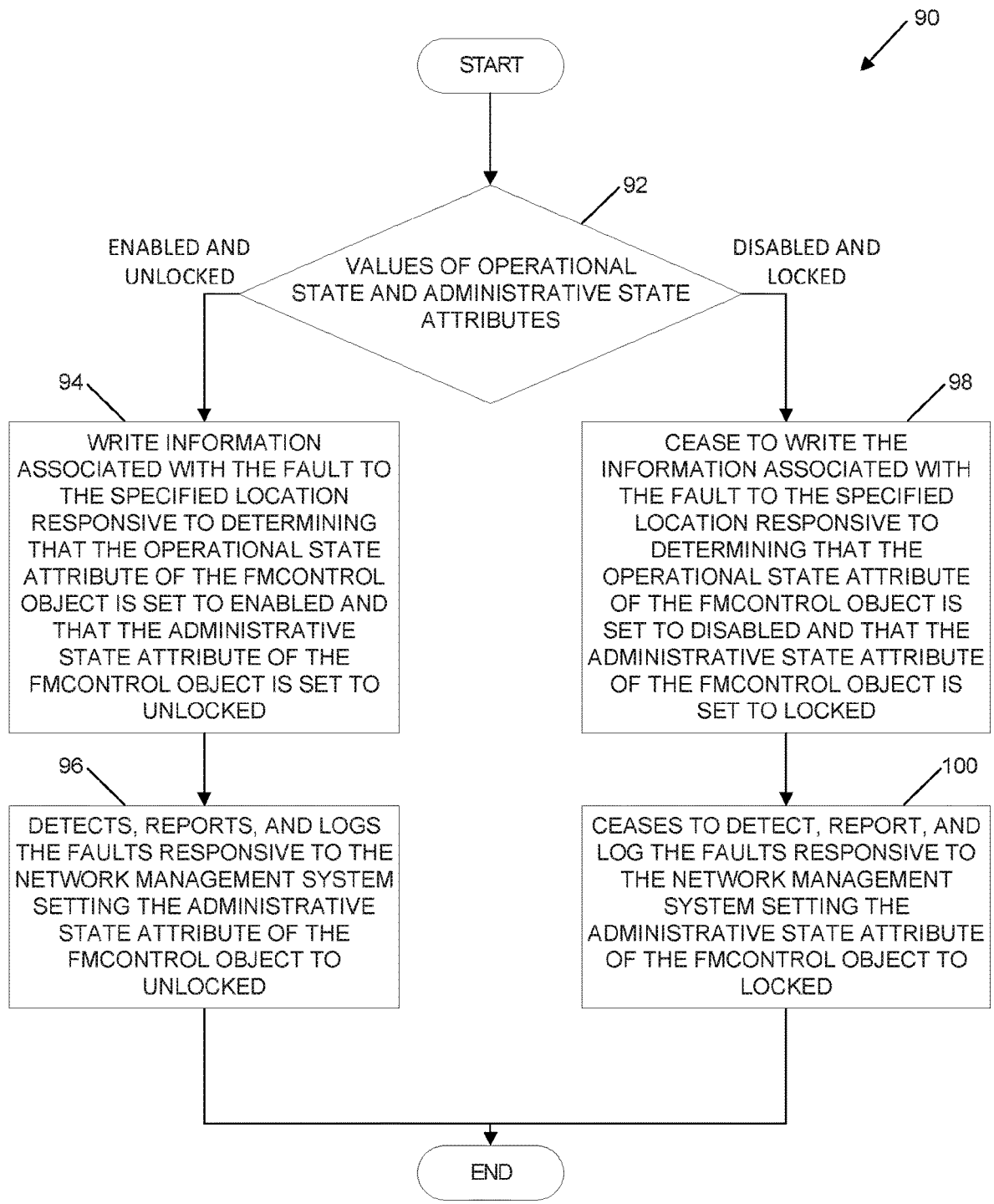
FIG. 5 is a flow diagram illustrating a method, implemented by network equipment, of writing fault reports to a log file according to one embodiment of the present disclosure.

FIG. 5 is a flow diagram illustrating a method 90, implemented by network equipment, of writing the fault reports to the log file according to one embodiment of the present disclosure. As seen in FIG. 5, method 90 begins with checking the values of the administrativeState and operationalState attributes of FMControl object 16 (box 92). Responsive to determining that the operationalState attribute is set to ENABLED, and that the administrativeState attribute is set to UNLOCKED, MF object 14 will write information associated with a detected fault to the location specified in the faultReportLog attribute of MFControl object 16 (box 94). Additionally, as stated above, setting these attributes indicates to MF object 14 to detect, report, and log the faults (box 96). However, responsive to determining that the operationalState attribute is set to DISABLED and that the administrativeState attribute is set to LOCKED, MF object 14 will not write information associated with a detected fault to the location specified in the faultReportLog attribute of MFControl object 16 (box 98) and cease to detect, report, and log the faults (box 100).

Figure 6:
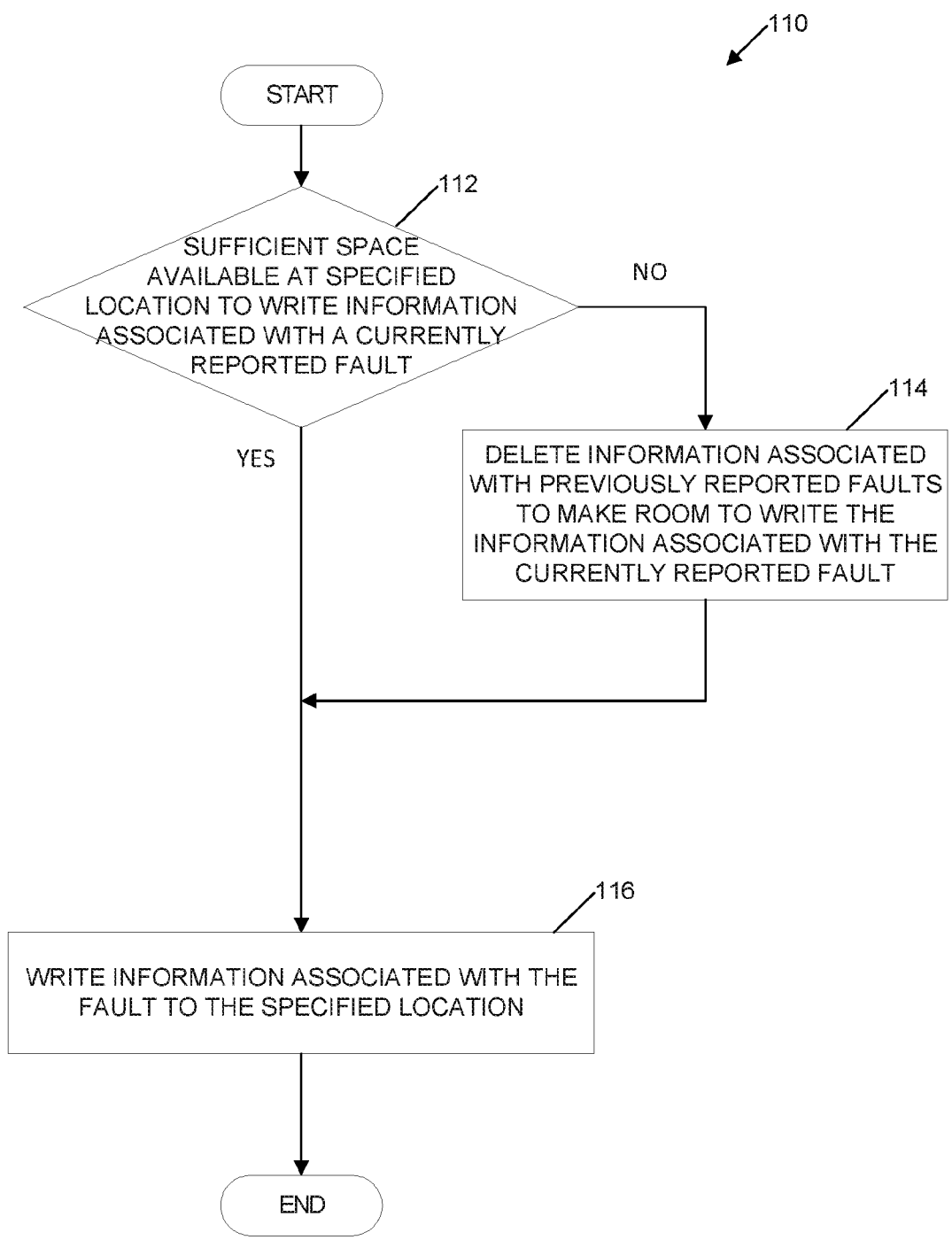
FIG. 6 is a flow diagram illustrating a method, implemented by network equipment, of indicating whether the network equipment has sufficient resources to detect faults, produce fault reports, and log the fault reports according to one embodiment of the present disclosure.

FIG. 6 is a flow diagram illustrating a method 110, implemented by network equipment, of indicating whether the network equipment has sufficient resources to detect faults, generate fault reports, and log the fault reports according to one embodiment of the present disclosure. Method 110 begins with MF object 14 determining whether sufficient space exists at the log file specified in the faultReportTarget attribute of FMControl object 16 to write a fault report associated with a currently detected fault (box 112). If sufficient space does not exist, MF object 14 deletes or overwrites the oldest fault reports stored in the log file to make room to write the new fault reports (box 114). When sufficient space does exist, however, MF object 14 writes the fault report to the log file (box 116).

Figure 7:
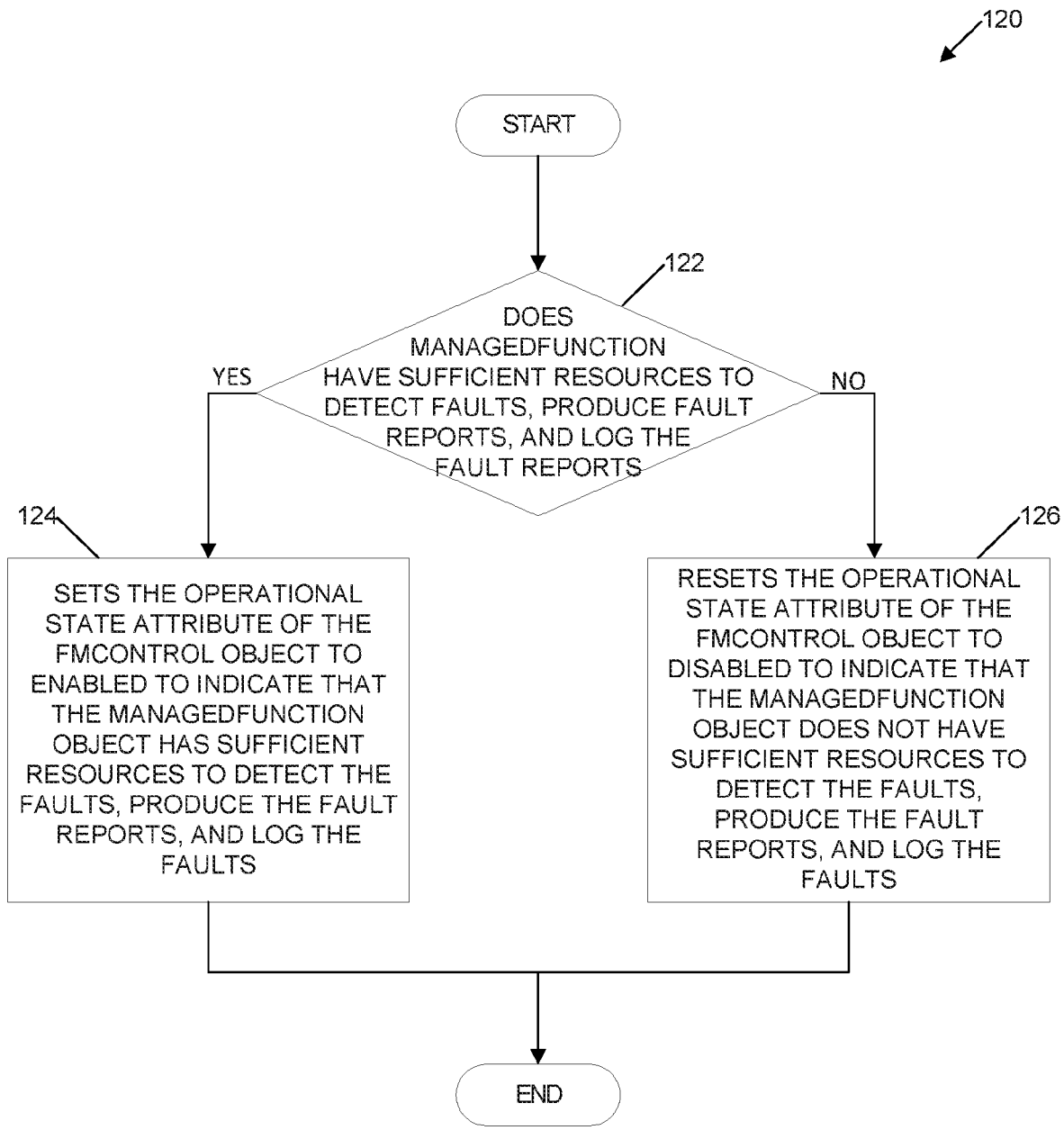
FIG. 7 is a flow diagram illustrating a method, implemented at a network management node, of performing a NRM FM procedure according to one embodiment of the present disclosure.

FIG. 7 is a flow diagram illustrating a method 120, implemented at a network management node, of performing a NRM FM procedure according to one embodiment of the present disclosure. Specifically, method 120 is performed by MF object 14 to indicate whether it does or does not have a sufficient amount of resources to perform the FM process.

As seen in FIG. 7, method 120 begins with MF object 14 checking to determine whether it has sufficient resources to detect faults, produce fault reports to send to other nodes, and to log the fault reports (box 122). If sufficient resources exist, MF object 14 sets the operationalState attribute of FMControl object 16 to ENABLED (box 124). If sufficient resources do not exist, however, MF object 14 resets the operationalState attribute of FMControl object 16 to DISABLED (box 124). So set, a Network Management System, such as MS 30, can determine whether MF object 14 does or does not have the resources it needs to perform the FM procedures simply by reading the operationalState attribute of the FMControl object 16.

Figure 8:
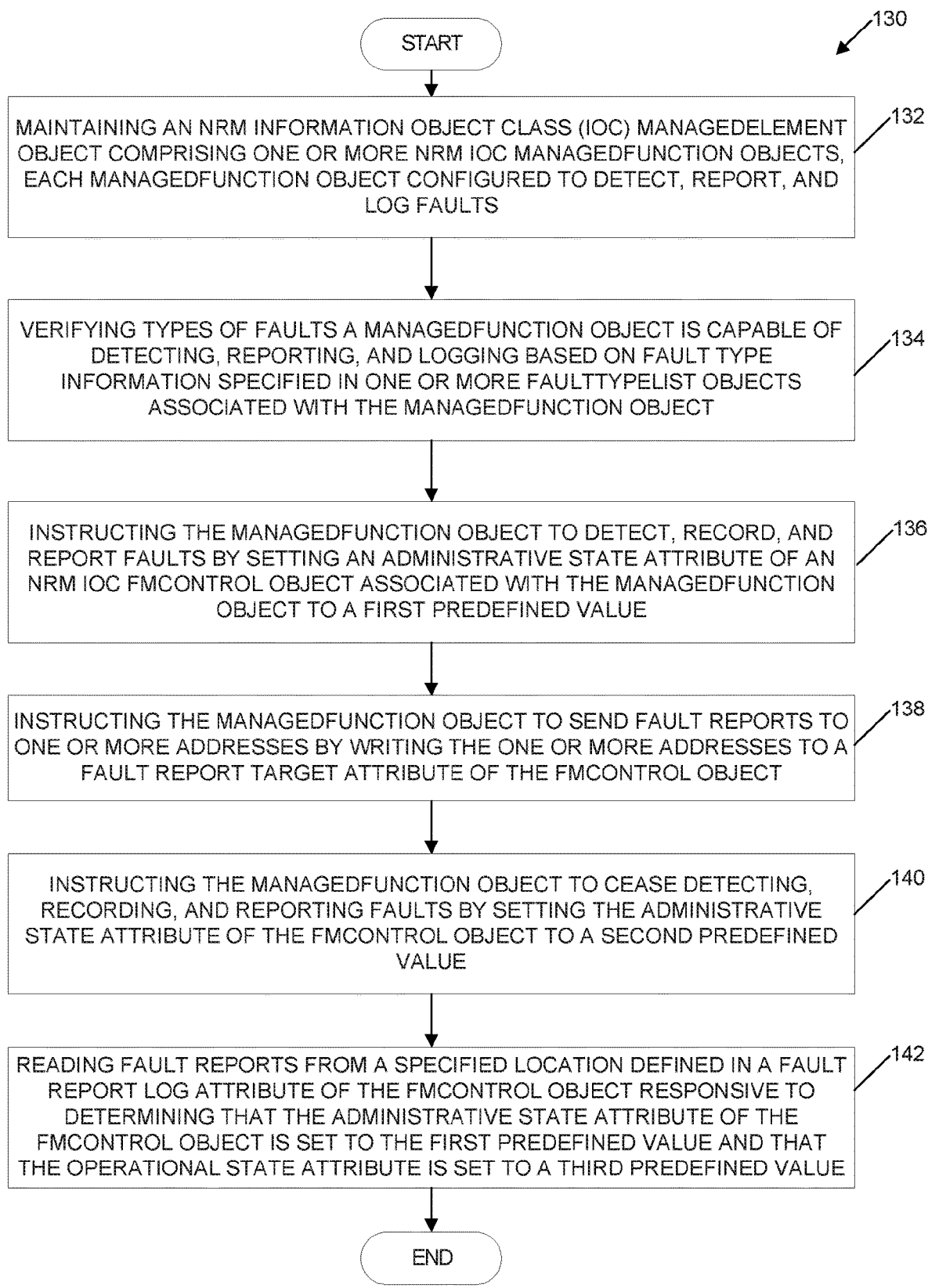
FIG. 8 is a flow diagram illustrating a method, implemented by network equipment, of detecting faults and writing fault reports according to one embodiment of the present disclosure.

FIG. 8 is a flow diagram illustrating a method, implemented by network equipment, of detecting faults and writing fault reports according to one embodiment of the present disclosure. As seen in FIG. 8, method 130 calls for maintaining an IOC ME object 12 comprising one or more NRM IOC MF objects 14. Each MF object 14 is configured to detect, report, and log faults (box 132). Additionally, each MF object 14 is associated with a NRM IOC FMControl object 16, one or more NRM faultTypeList objects 18, and a NRM currentFaultList object 20, as previously described. The Network Management System, such as MS 30, verifies the types of faults that MF object 14 is capable of detecting, reporting, and logging by reading the faultTypeList object 18 (box 134). MS 30 then indicates to MF object 14 that it can detect faults, generate fault reports, and send the fault reports to specified destination addresses by setting the administrativeState attribute of the FMControl object 16 to a first predefined value (e.g., UNLOCKED) (box 136). MS 30 also writes the one or more addresses of the nodes interested in receiving the error reports to the faultReportTarget attribute of FMControl object 16 to instruct the MF object 16 to send the fault reports to those addresses (box 138). If MS 30 decides to instruct MF object 14 to suspend or cease detecting, reporting, and logging faults, MS 30 will reset the administrativeState attribute of the FMControl object 16 to a second predefined value (e.g., LOCKED) (box 140). Regardless, however, if the administrativeState attribute of FMControl 16 is set to the first predefined value (e.g., UNLOCKED), and the operationalState attribute of FMControl attribute 16 is set to a third pre-defined value (e.g., ENABLED), MS 30 can read the fault reports from the log file specified in the faultReportLog attribute of the FMControl object 16 (box 142).

Figure 9:
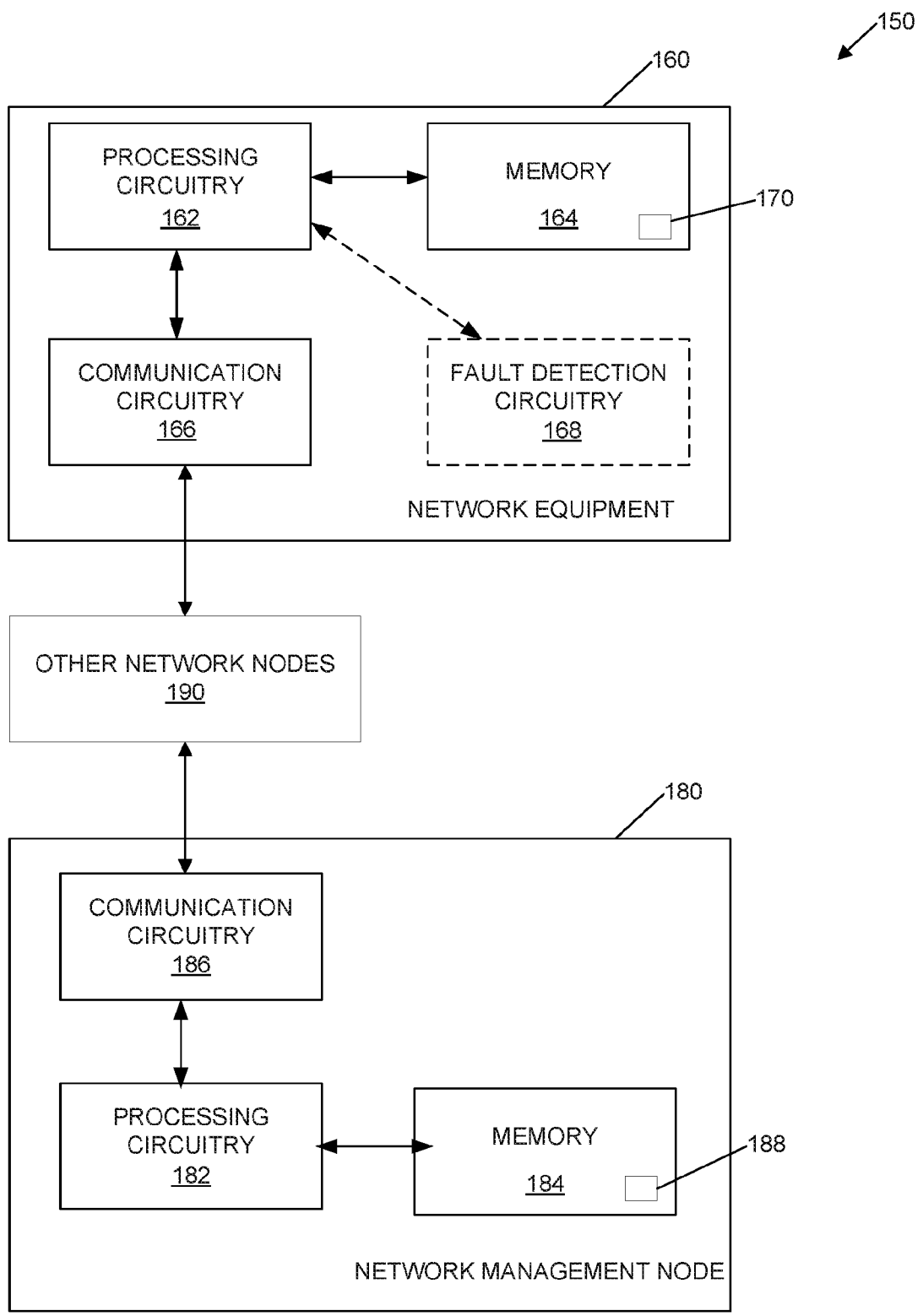
FIG. 9 is a functional block diagram of a network, including block diagrams of network equipment and a network management node, according to one embodiment of the present disclosure.

FIG. 9 illustrates a representative network 150 comprising an instance of network equipment 160, a network management node 180, such as MS 30, and one or more other network nodes 190 communicatively connected to network equipment 160 and network management node 180. The other network nodes 190 may include, for example, a device configured as the file storage location specified in the faultReportLog attribute of FMControl object 16, and one or more devices having the addresses listed in the faultReportTarget attribute of FMControl 16.

The network equipment 160, which in one embodiment executes MF object 14, includes processing circuitry 162 (e.g., one or more general and/or special purpose microprocessors etc.), memory 164, communication circuitry 166, and in some embodiments, fault detection circuitry 168 operative to detect faults and report information associated with the faults to processing circuitry 162. Although the memory 164 is depicted as being separate from the processing circuitry 162, those of skill in the art understand that the present disclosure is not so limited. In one embodiment, processing circuitry 162 includes memory 164 as internal memory, such as a cache memory. Those of skill in the art additionally understand that virtualization techniques allow some functions nominally executed by the processing circuitry 162 to actually be executed by other hardware, perhaps remotely located (e.g., in the so-called "cloud").

The memory 164 is operative to store, and the processing circuitry 162 is operative to execute, software that implements the NRM FM procedure described herein to detect faults, generate fault reports about the faults, and send the fault reports to one or more destination addresses. In particular, the processing circuitry 162 is operative to perform any of the methods previously described and claimed herein. To accomplish communication, network equipment 160 may additionally have components or circuits not depicted in FIG. 9, such as a wireless communication transceiver or other dedicated network hardware, a user interface, and the like.

The network management node 180 (e.g., MS 30) includes processing circuitry 182, memory 184, and communication circuitry 186. As above, memory 184 and processing circuitry 182 are illustrated as comprising separate, independent components. However, those of skill in the art understand that the present embodiments are not so limited. In at least one embodiment, processing circuitry 182 includes memory 184 as internal memory, such as a cache memory. Those of skill in the art additionally understand that virtualization techniques allow some functions nominally executed by the processing circuitry 182 to actually be executed by other hardware, perhaps remotely located (e.g., in the so-called "cloud"). The memory 184 is operative to store, and the processing circuitry 182 is operative to execute, software that facilitates fault detection, generating fault reports, sending those reports to one or more destination addresses, and logging those fault reports according to a NRM FM procedure as described herein. In particular, the processing circuitry 182 is operative to perform any of the methods previously described and claimed herein. Additionally, network management node 180 may other have components or circuits not specifically shown in FIG. 9.

In all embodiments, the processing circuitry 162, 182 may comprise any sequential state machine operative to execute machine instructions stored as machine-readable computer control programs 170, 188 in memory 164, 184, respectively. For example, such control programs 170, 188 may comprise one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

In all embodiments, the memory 164, 184 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the communication circuits 166, 186 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 166, 186 implement receiver and transmitter functionality appropriate to the communication network links (e.g., optical, electrical, and the like). The transmitter and receiver functions may share circuit components and/or software, or alternatively may be implemented separately.

Embodiments of the present disclosure present numerous advantages over the prior art. By way of example only, conventional FM procedures require a Network Management System such as MS 30 to implement a subscribe/unsubscribe mechanism with MF object 14 at runtime so that MF object 14 could send alarm notifications using the prior art notifyNewAlarm function. Embodiments of the present disclosure, however, negate the need for such subscription mechanisms. This is because the present embodiments configure MS 30 to identify the one or more addresses where fault reports are to be sent in the faultReportTarget attribute of FMControl object 16. The MF object 14 would then send the fault reports to those addresses whenever a fault report is produced and recorded, but only if the administrativeState attribute of the FMControl object 16 is set to a predetermined value, such as UNLOCKED.

Additionally, the present embodiments reduce complexity by utilizing standardized configuration management operations and functions (i.e., READ, WRITE, SEND) to implement FM procedures rather than the specialized operations and functions needed to set up (i.e., subscribe) and unsubscribe the prior art subscription mechanisms. This is especially beneficial because the standardized functions are already implemented in FM systems and would replace the specialized functions and operations. Thus, no new functions or operations are required. In particular, the MS 30 WRITES the administrativeState attribute to be UNLOCKED or LOCKED, as well as the addresses in the faultReportTarget attribute of FMControl object 16. MS 30 also READS the operationalState attribute of FMControl object 16. As for the MF object 14, it WRITES the operationalState attribute to be ENABLED or DISABLED, and READS the addresses in the faultReportTarget attribute of FMControl object 16, as well as the path to the file system specified in the faultReportLog attribute for logging the fault reports.

Moreover, prior art systems require the runtime implementation of a complex system of operations to establish an understanding of the types of faults that can be reported from each MF object 14 or group of MF objects 14. With the present embodiments, however, these functions are implemented when the system is set up, and further managed on a per-MF object basis. Additionally, MS 30 and MF object 14 can modify certain attributes of an MFControl object 16 at runtime, where prior art systems cannot.

The present embodiment may, of course, be carried out in other ways than those specifically set forth herein without departing from essential characteristics of the embodiment. The present embodiments are to be considered in all respects as illustrative and not restrictive, and all changes coming within the meaning and equivalency range of the appended claims are intended to be embraced therein.

What is claimed is:

1. A method, performed by equipment operative in a network, of performing a Network Resource Management (NRM) Fault Management (FM) procedure, the method comprising:
    maintaining a NRM Information Object Class (IOC) ManagedElement object comprising one or more NRM IOC ManagedFunction objects, each ManagedFunction object configured to detect, report, and log faults;
    maintaining for each ManagedFunction object:
        a NRM IOC FMControl object comprising attributes indicating:
            an administrative state of the FMControl object configured to be set and reset to start and stop, respectively, fault detection, reporting, and logging;
            an operational state of the FMControl object; and
            a fault report target identifying one or more addresses where the ManagedFunction object is to send fault reports;
        one or more NRM faultTypeList objects, each faultTypeList object comprising attributes specifying types of faults that can be detected and reported by the ManagedFunction object; and
        a NRM currentFaultList object comprising current fault information;
    verifying the types of faults the ManagedFunction object is capable of detecting, reporting, and logging, and setting the administrative state attribute of the FMControl object to control the ManagedFunction object to detect faults and send the fault reports;
    responsive to a network Management System setting the administrative state attribute of the FMControl object, and if the operational state attribute of the FMControl object is set, detecting, reporting, and logging the faults; and
    sending the fault reports to the one or more addresses specified in the fault report target attribute of the FMControl object.

2. The method of claim 1 wherein the FMControl object further comprises a fault report log attribute indicating a specified location where the ManagedFunction object is to log the faults.

3. The method of claim 2 further comprising:
    writing information associated with the fault to the specified location responsive to determining that the operational state attribute of the FMControl object is set to ENABLED and that the administrative state attribute of the FMControl object is set to UNLOCKED; and
    ceasing to write the information associated with the fault to the specified location responsive to determining that the operational state attribute of the FMControl object is set to DISABLED and that the administrative state attribute of the FMControl object is set to LOCKED.

4. The method of claim 3 wherein writing the information associated with the fault to the specified location comprises:
    verifying that a sufficient amount of space is available at the specified location to write information associated with a currently reported fault; and
    if an insufficient amount of space is available, deleting information associated with previously reported faults to make room to write the information associated with the currently reported fault.

5. The method of claim 3 wherein the ManagedFunction object:
    detects, reports, and logs the faults responsive to the network Management System setting the administrative state attribute of the FMControl object to UNLOCKED; and
    ceases to detect, report, and log the faults responsive to the network Management System setting the administrative state attribute of the FMControl object to LOCKED.

6. The method of claim 1 wherein the ManagedElement object and the one or more ManagedFunction objects are provisioned in the equipment.

7. The method of claim 1 wherein the administrative state attribute of the FMControl object is set or reset by the network Management System at run-time.

8. The method of claim 1 wherein the operational state attribute of the FMControl object is set or reset by the ManagedFunction object at run-time.

9. The method of claim 8 wherein the ManagedFunction object:
    sets the operational state attribute of the FMControl object to ENABLED to indicate that the ManagedFunction object has a sufficient amount of resources to detect the faults, produce the fault reports, and log the faults; and
    resets the operational state attribute of the FMControl object to DISABLED to indicate that the ManagedFunction object does not have a sufficient amount of resources to detect the faults, produce the fault reports, and log the faults.

10. An equipment operative in a network, the equipment comprising:
- communication circuitry configured to send fault reports to a network node; and
- processing circuitry operatively connected to the communication circuitry and configured to:
  - maintain a NRM Information Object Class (IOC) ManagedElement object comprising one or more NRM IOC ManagedFunction objects, each ManagedFunction object configured to detect, report, and log faults;
  - maintain for each ManagedFunction object:
    - a NRM IOC FMControl object comprising attributes indicating:
      - an administrative state of the FMControl object configured to be set and reset to start and stop, respectively, fault detection, reporting, and logging;
      - an operational state of the FMControl object; and
      - a fault report target identifying one or more addresses where the ManagedFunction object is to send the fault reports;
    - one or more NRM faultTypeList objects, each faultTypeList object comprising attributes specifying types of faults that can be detected and reported by the ManagedFunction object; and
    - a NRM currentFaultList object comprising current fault information;
  - verify the types of faults the ManagedFunction object is capable of detecting, reporting, and logging, and set the administrative state attribute of the FMControl object to control the ManagedFunction object to detect faults and send the fault reports;
  - responsive to a network Management System setting the administrative state attribute of the FMControl object, and if the operational state attribute of the FMControl object is set, detect, report, and log the faults; and
    - send the fault reports to the one or more addresses specified in the fault report target attribute of the FMControl object.

11. The equipment of claim 10 wherein the FMControl object further comprises a fault report log attribute indicating a specified location where the ManagedFunction object is to log the faults.

12. The equipment of claim 11 wherein the processing circuitry is further configured to:
- write information associated with the fault to the specified location responsive to determining that the operational state attribute of the FMControl object is set to ENABLED, and that the administrative state attribute of the FMControl object is set to UNLOCKED; and
- cease writing the reported fault to the specified location responsive to determining that the operational state attribute of the FMControl object is set to DISABLED, and that the administrative state attribute of the FMControl object is set to LOCKED.

13. The equipment of claim 12 wherein to write the information associated with the fault to the specified location, the processing circuitry is configured to:
- verify that a sufficient amount of space is available at the specified location to write information associated with a currently reported fault; and
- if an insufficient amount of space is available, delete information associated with previously reported faults to make room to write the information associated with the currently reported fault.

14. The equipment of claim 13 wherein the processing circuitry is further configured to:
- detect, report, and log the faults responsive to the network Management System setting the administrative state attribute of the FMControl object to UNLOCKED; and
- cease detecting, reporting, and logging the faults responsive to the network Management System setting the administrative state attribute of the FMControl object to LOCKED.

15. The equipment of claim 10 wherein the ManagedElement object and the one or more ManagedFunction objects are provisioned in the equipment.

16. The equipment of claim 10 wherein the processing circuitry sets and resets the administrative state attribute of the FMControl object is set at run-time.

17. The equipment of claim 10 wherein the processing circuitry sets and resets the operational state attribute of the FMControl object at run-time.

18. The equipment of claim 17 wherein the processing circuitry:
- sets the operational state attribute of the FMControl object to ENABLED to indicate that the ManagedFunction object has a sufficient amount of resources to detect the faults, produce the fault reports, and log the fault; and
- resets the operational state attribute of the FMControl object to DISABLED to indicate that the ManagedFunction object does not have a sufficient amount of resources to detect the faults, produce the fault reports, and log the faults.

19. A non-transitory computer readable medium, having instructions stored thereon that, when executed by processing circuitry on an instance of network equipment, cause the processing circuitry to:
- maintain a NRM Information Object Class (IOC) ManagedElement object comprising one or more NRM IOC ManagedFunction objects, each ManagedFunction object configured to detect, report, and log faults;
- maintain for each ManagedFunction object:
  - a NRM IOC FMControl object comprising attributes indicating:
    - an administrative state of the FMControl object configured to be set and reset to start and stop, respectively, fault detection, reporting, and logging;
    - an operational state of the FMControl object; and
    - a fault report target identifying one or more addresses where the ManagedFunction object is to send the fault reports;
  - one or more NRM faultTypeList objects, each faultTypeList object comprising attributes specifying types of faults that can be detected and reported by the ManagedFunction object; and
  - a NRM currentFaultList object comprising current fault information;
- verify the types of faults the ManagedFunction object is capable of detecting, reporting, and logging, and setting the administrative state attribute of the FMControl object to control the ManagedFunction object to detect faults and send the fault reports;
- responsive to a network Management System setting the administrative state attribute of the FMControl object, and if the operational state attribute of the FMControl object is set, detect, report, and log the faults; and
- send the fault reports to the one or more addresses specified in the fault report target attribute of the FMControl object.

* * * * *